(12) United States Patent
Hansen

(10) Patent No.: US 7,477,614 B2
(45) Date of Patent: Jan. 13, 2009

(54) SECURE VIDEOCONFERENCING EQUIPMENT SWITCHING SYSTEM AND METHOD

(75) Inventor: Michael E. Hansen, Livermore, CA (US)

(73) Assignee: Sandia Corporation, Livermore, CA (US)

(*) Notice: Subject to any disclaimer, the term of this patent is extended or adjusted under 35 U.S.C. 154(b) by 1070 days.

(21) Appl. No.: 10/834,421

(22) Filed: Apr. 29, 2004

(65) Prior Publication Data

US 2005/0243742 A1 Nov. 3, 2005

(51) Int. Cl.
*H04L 12/16* (2006.01)
(52) U.S. Cl. .................... 370/264; 370/401; 348/14.09; 704/262; 705/1
(58) Field of Classification Search .............. 348/14.09; 370/264, 401; 704/262; 705/1
See application file for complete search history.

(56) References Cited

U.S. PATENT DOCUMENTS

| | | | |
|---|---|---|---|
| 4,531,024 A | | 7/1985 | Colton |
| 5,793,415 A | * | 8/1998 | Gregory et al. ............ 348/14.1 |
| 2004/0111739 A1 | * | 6/2004 | Winegard ..................... 725/31 |
| 2004/0120707 A1 | * | 6/2004 | Winegard ..................... 398/19 |

* cited by examiner

*Primary Examiner*—Gerald Gauthier
(74) *Attorney, Agent, or Firm*—Dorsey & Whitney LLP; Timothy P. Evans

(57) ABSTRACT

A switching system and method are provided to facilitate use of videoconference facilities over a plurality of security levels. The system includes a switch coupled to a plurality of codecs and communication networks. Audio/Visual peripheral components are connected to the switch. The switch couples control and data signals between the Audio/Visual peripheral components and one but nor both of the plurality of codecs. The switch additionally couples communication networks of the appropriate security level to each of the codecs. In this manner, a videoconferencing facility is provided for use on both secure and non-secure networks.

27 Claims, 4 Drawing Sheets

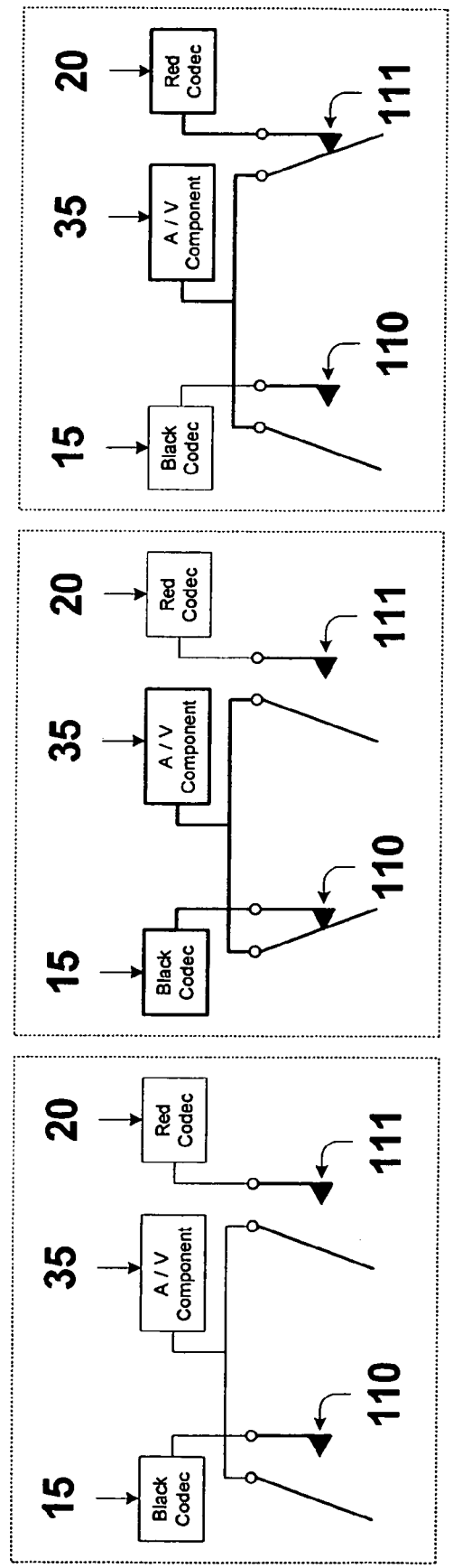

SECURE VIDEOCONFERENCING EQUIPMENT SWITCHING SYSTEM AND METHOD

STATEMENT REGARDING FEDERALLY-FUNDED RESEARCH

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

TECHNICAL FIELD

The present invention relates to videoconference systems, and more particularly, to systems for switching communication networks and peripheral devices between videoconference systems.

BACKGROUND OF THE INVENTION

Videoconference systems are generally systems of equipment used to transport audio and video information. There are currently two primary worldwide standards of communication used to transport information between videoconference systems. The first standard is known as H.320, and defines communication via integrated services digital network or "ISDN" telephone communication channels. The second standard is known as H.323, and defines communication using TCP/IP (i.e., transmission control protocol/internet protocol) communication protocols (typically via Ethernet).

It is often important to provide videoconference facilities with communication network access matched to the security requirements of the information present in the audiovisual data. For example, two networks may be provided for communications—one with a higher level of security than the other. This is sometimes referred to as a red/black system, where the "red" network refers to the more secure network. Communications that require more security than the less stringent security available on the "black" network must be conducted over the "red" network.

One approach to providing videoconference facilities with access to several networks, each with a different security level, is simply to provide more than one of each component necessary to form the videoconference system, or a portion of the videoconference system. For example, in a common room set up for videoconferencing on two different networks—one secure, and one not secure—two of all the necessary components (cameras, microphones, cables, and the like) would be provided, with one set being used for the red network, and the other for the black network. The need to provide duplicates of all of the videoconferencing equipment adds significant cost to the system.

One approach that substantially avoids the need for duplicate components is to utilize a patch bay. The patch bay contains links to the common audio/visual peripheral components (cameras, microphones, display devices, and the like), the red network(s), the black network(s), the red videoconference system coder/decoder (codec), and the black codec. Connections are established using patch cords between groups of connectors. For example, the black codec may first be connected to the common audio/visual peripheral components (A/V components) and the black network(s), and by moving the requisite cables —the red codec may be connected to the common A/V components and the red network(s). Such a patch bay can be expensive, and is generally inefficient, prone to error, and limited in life due to physical wear on the connectors. In the event of a configuration error, highly confidential information may be communicated on the non-secure network.

There is therefore a need for a system allowing efficient switching between secure and non-secure videoconference systems without compromising the confidentiality of information intended for communication over the secure network(s).

SUMMARY OF THE INVENTION

A switching system and method includes first and second codecs, first network(s), second network(s), and a set of A/V components coupled to a switch. The first and second codecs communicate via the first and second network(s), respectively. The first and second network(s) have different security levels. The audiovisual peripheral components serve both the first and second codecs, one at a time. The switch is operable to couple communication signals to or from the first codec and the first network(s) or the second codec and the second network(s). The switch is also operable to couple audiovisual signals to or from the set of A/V components and the first and second codecs, one at a time. The switch is designed so that the first codec and the second codec cannot both be connected to the audiovisual peripheral components or their communication networks at the same time, thereby providing positive control over which communication network is in operation. For example, the switch may include DC (i.e., direct current)-actuated electromechanical relays, which also have the advantage of providing cross-talk immunity. The switching system and method may be implemented as a videoconferencing facility for classified or unclassified use.

BRIEF DESCRIPTION OF THE DRAWINGS

FIG. 3A depicts an Isolated Mode of the ISDN switch, and FIG. 3B depicts an Active Mode of the ISDN Switch, according to an example of the present invention. FIGS. 3A and 3B depict a single conductor of a multi-conductor signal path, according to an example of the present invention.

FIGS. 4A-4C are diagrams of the Secure A/V Signal Switching Method as used in Switch 10 of FIG. 1, according to an example of the present invention. FIG. 4A depicts an Isolated Mode, according to an example of the present invention. FIG. 4B depicts a Black Mode, according to an example of the present invention. FIG. 4C depicts a Red Mode, according to an example of the present invention. These diagrams represent a single conductor of a multi-conductor signal path, according to an example of the present invention.

DETAILED DESCRIPTION OF PREFERRED EMBODIMENTS

Figure 1:
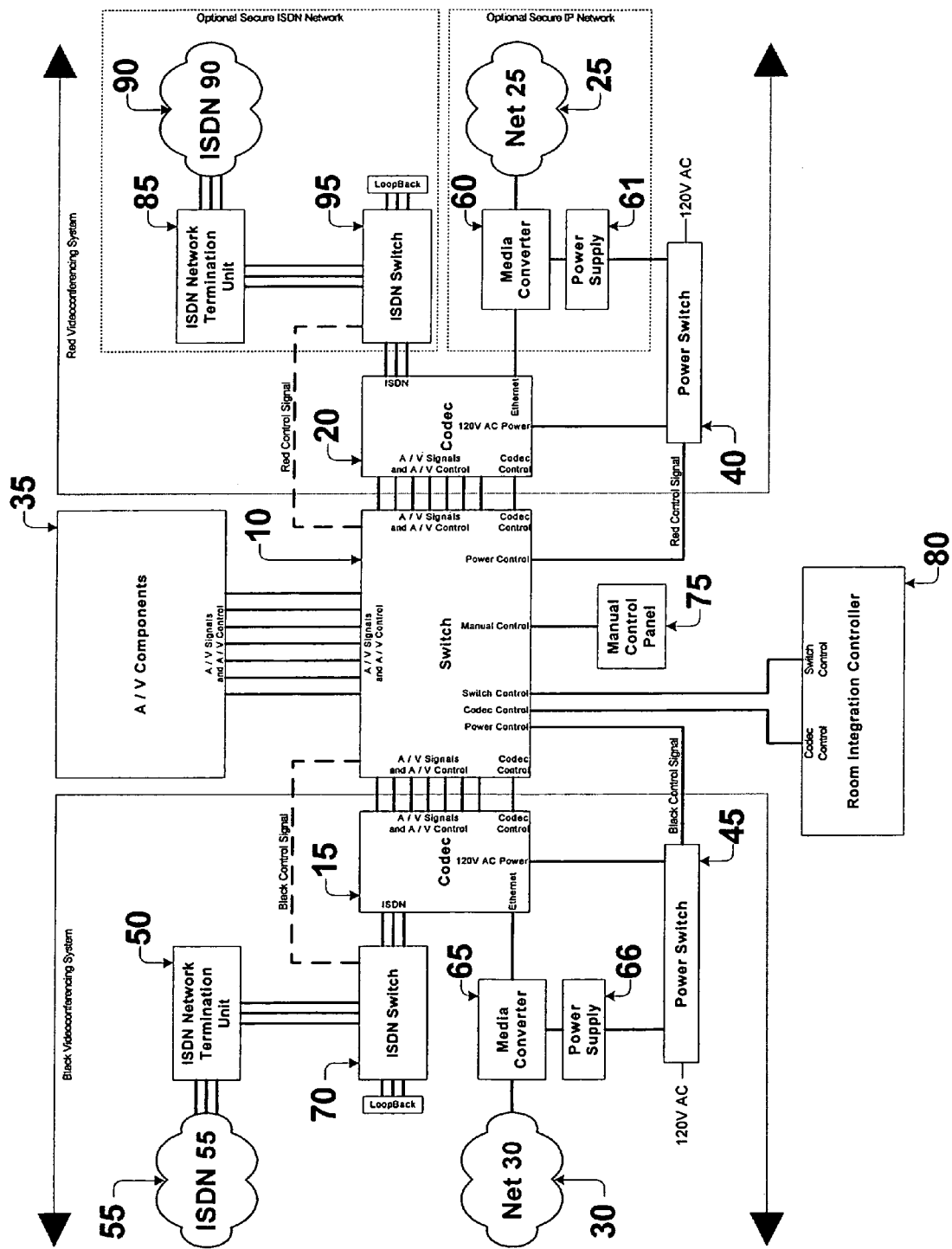
FIG. 1 is a block diagram depicting a switching system according to an example of the present invention.

An example of a switching system according to the present invention is shown in FIG. 1. A switching unit 10, comprising an electromechanical relay network, is connected, between two coder/decoders (codecs) 15 and 20. The codec 20 is allowed to communicate with secure ISDN network 90 and/or secure IP network 25. The codec 15 is allowed to communicate with the lower security ISDN network 55 and/or the lower security IP network 30. The ISDN network 55 may be a lower security telephone network at the point of use than secure ISDN network 90. The ISDN networks 55 and 90 maybe completely separate telephone networks, or may share the same telephone network infrastructure. In shared embodiments, there may advantageously be some encrypting/decrypting unit between the point of use of the secure ISDN network 90 and the shared telephone network infrastructure. The IP network 30 may be a lower security IP network at the point of use than the secure IP network 25. The IP networks 25 and 30 may be completely separate IP networks, or may share the same IP network infrastructure. In a shared embodiments, there will advantageously be provided an encrypting/decrypting apparatus between the point of use of at least the secure IP network 25 and the shared IP network infrastructure. A single array of Audio/Video Peripheral Components 35 is connected to the switching unit 10 to be connected to the codec 15 or the codec 20 according to the selected mode. Although only two codecs and two sets of networks are shown in FIG. 1, any number of codecs may be connected to the switching unit 10 in other embodiments of the invention. The codecs 15 and 20 may be implemented as known in the art, and generally provide analog-to-digital and digital-to-analog conversion. In some embodiments, separate analog-to-digital and digital-to-analog converters may be used in place of the codecs 15 and 20.

Further, although two sets of networks are shown in FIG. 1, in some embodiments, only a single codec and a single set of network are present. In these embodiments, the switching unit 10 switches the single codec between a network-connected Active Mode and an Isolated Mode. In these embodiments, the A/V components 35 are typically connected directly to the single codec and not to the switching unit 10.

The switching unit 10 is further connected to one or more AN components 35. The A/V components 35 may include, but are not limited to one or a plurality of: cameras, microphones, video monitors, keyboards and the like. Generally any equipment to be used to couple information, including data, to or from the codecs 15 and 20 may be connected to the switching unit 10. The switching unit 10 functions to direct the audio, visual, data and/or control signals from the components 35 to codec 15, or codec 20, or an isolated (unconnected) state. The switching unit 10 may be implemented in a variety of ways, as known in the art as long as it provides isolation between the secure network 25 and the non-secure network 30, and isolation between connected and unconnected modes. In a preferred embodiment, the switching unit 10 is implemented using DC actuated electromechanical relays to positively isolate signals coupled from the secure network 25 and/or the secure ISDN network 90 to secure the codec 20 from signals coupled from the lower security network 30 and/or the lower security ISDN network 55 to the non-secure codec 15, and to isolate signals generated by the A/V components 35 from either the codec 15 or the codec 25 or both. Although solid state relays may be used for portions of the switching unit 10 in some embodiments, solid state relays do not provide an actual physical disconnection and are subject to leakage and cross-talk, and therefore are not preferred for use in the switching system. The switching unit 10 preferably includes an interlocking mechanism (not shown) such that signals from the A/V components 35 cannot simultaneously be applied to both of the codecs 15 and 20. Rather, signals from the A/V components 35 can be coupled only to the codec 15 or the codec 20 or be disconnected from all codecs at a given time. The switching system 10 develops two or more separate DC control signals to drive relays throughout the switching system to make or sever the connections as described herein. For example, a first DC control signal may be designated to control a "red", or higher security system, while a second DC control signal is designated to control a "black", or lower security system. The switching system 10 is designed to prohibit more than one of the DC control signals from being energized at any given time.

Figure 3B:
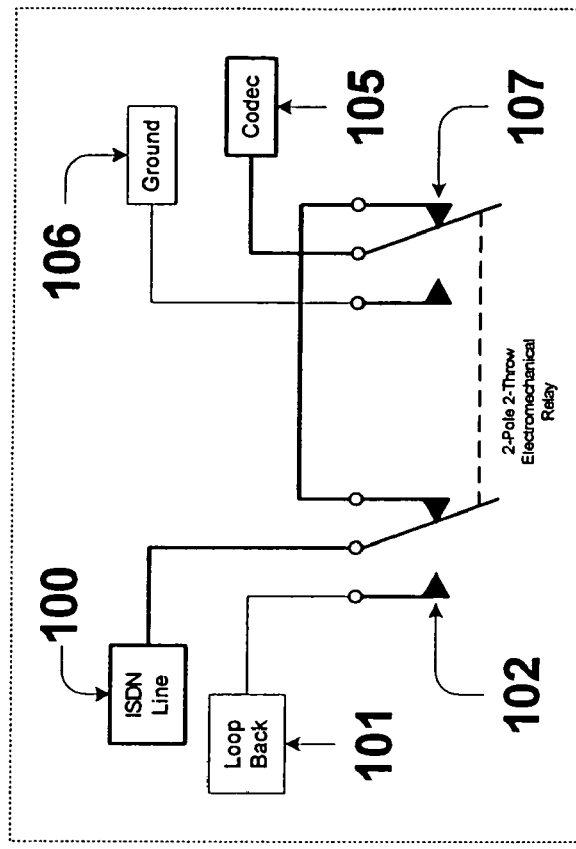
FIGS. 3A and 3B are diagrams of the Double ISDN Switching Method used in ISDN Switch 70 and ISDN Switch 95 of FIG. 1.
Figure 3A:
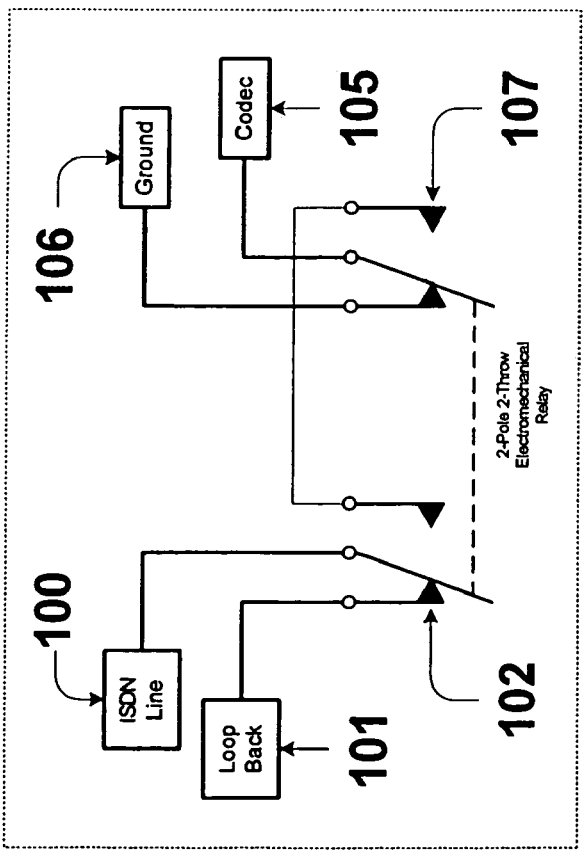

For example; in the switching of ISDN signals as in ISDN Switch 70 and ISDN Switch 95 of FIG. 1, a double isolated switching may be used as a component of the ISDN switch 70 and/or the ISDN switch 95, as depicted in FIG. 3. In a first mode of the ISDN switch, as shown in FIG. 3A, a 2-pole 2-throw elecromechanical relay is non-energized. An ISDN line 100 (connected to the ISDN network 55 or 90) and a loop back connector 101 are wired to a first pole 102 of the switch. A codec 105 (such as the codec 15 in the case of the ISDN network 55 or the codec 20 in the case of the ISDN network 90) and ground 106 are wired to a second pole 107. The ground 106 is representative of typically any electrically grounding source or other reference signal. In this first mode, the ISDN line 100 is connected to the loop back plug 101, and the codec 105 is connected to the ground 106. In a second mode, depicted in FIG. 3B, the relay is shown in its energized state. In this second mode, the loop back plug 101 and ground 106 are unconnected and the ISDN line 100 is connected to the codec 105. The two air gaps of the two relay poles provide double isolation of the ISDN line 100 from the codec 105 in the Isolated Mode shown in FIG. 3A. Connecting the ISDN line 100 to the loop back plug 101 when the ISDN switch is in isolated mode advantageously avoids causing trunk failure alarms from telephone company switching equipment when using ISDN PRI (Primary Rate Interface, typically having 23 data channels per line). The loop back for ISDN BRI (Basic Rate Interface, having 2 data channels per line) is useful for keeping the line itself from being disabled by the telephone company switching equipment when disconnected for long periods, but not required. The loop back connector 101 maybe implemented as a connector plug with pins hooked together. There may be one grouping of pins for ISDN BRI lines and a different grouping of pins for ISDN PRI lines. In this manner, the switch may switch BRI or PRI without modification. The ISDN switches 70 and 95 each operate in one of two modes—isolated or connected. Accordingly, the ISDN switch 70 is either in 'black mode', and connected to the ISDN network 55 or isolated mode, isolated from the ISDN network 55. The ISDN switch 95 is either in 'red mode', connected to the ISDN network 90, or isolated mode isolated from the ISDN network 90. The ISDN switches 70 and 95 may be housed within the switching unit 10 or may be separate from the switching unit 10.

In the switching of A/V signals within switching unit 10, a Secure A/V Signal Switching Method is used as depicted in FIG. 4. FIG. 4A depicts operation of a subset of the switching unit 10 during the switching of A/V signals. The black codec 15 is wired to the open pole of a first electromechanical relay 110. The red codec 20 is wired to the open pole of a second electromechanical relay 111. The A/V peripheral component 35 is wired to the movable pole of both the first and second electromechanical relays 110 and 111. In a first (Isolated) mode, as depicted in FIG. 4A, both relays are de-energized, the black codec 15 is unconnected, the red codec 20 is unconnected, and the A/V peripheral component 35 is unconnected. In a second (Black) mode, the first relay 110 is energized, the second relay 111 is de-energized, the black codec 15 is connected to the A/V peripheral component 35, and the red codec 20 is unconnected. In a third (Red) mode, the first relay 110 is de-energized, the second relay is energized 111, the black codec 15 is unconnected, and the red codec 20 is connected to the A/V peripheral component 35. Although not shown, additional relays and codecs may be connected in other embodiments of the invention. The switching unit 10 contains control interlocking to prevent more than one relay from being energized at any given time. Generally, at least one relay is provided for each codec so that only a selected codec may be connected to a particular A/V component at any given time. In this manner, unpowered circuitry of non-selected codecs is prevented or inhibited from degrading the desired signals.

Figure 2:
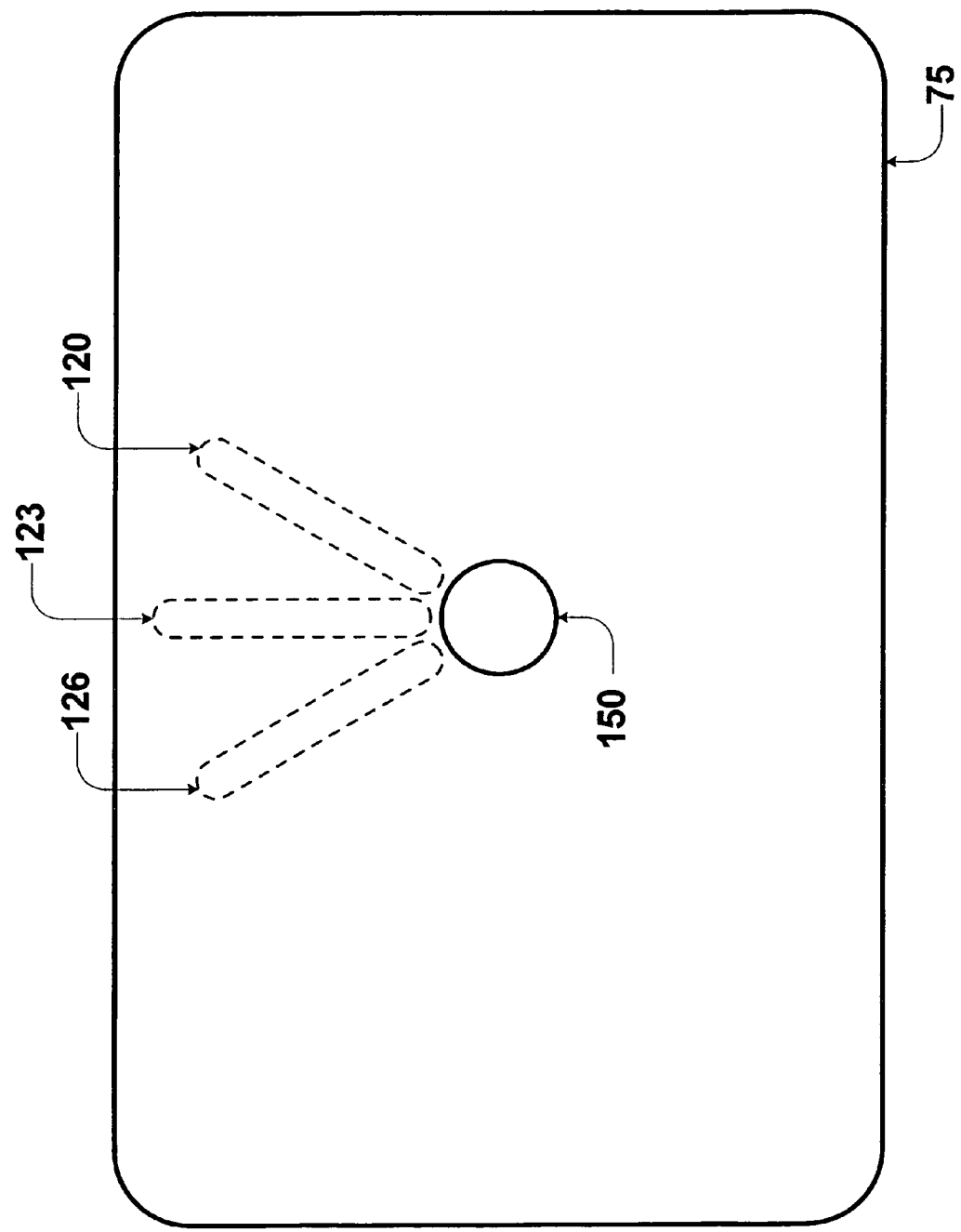
FIG. 2 is a pictorial diagram of a manual control panel 75 used in the switching system of FIG. 1, according to an example of the present invention.

A manual control panel 75 is coupled to the switching unit 10. The manual control panel 75 may be incorporated into the housing of the switching unit 10 in some embodiments, or may be separate from the switching unit 10. The manual control panel 75 may be mounted remotely for convenience. The manual control panel 75 may be implemented using any type of selector switch. In some embodiments, the manual control panel 75 is implemented as a key switch requiring a key to move the switch. This allows the switch to be removed after setting a mode, preventing or deterring an unauthorized change in mode. The manual control panel provides a primary means for selecting the Mode of the control system. A key actuated switch on the manual control panel provides a minimum of three mode selections. In a first mode, the codec 15 is connected to the A/V components 35, the ISDN network 55, and/or the IP network 30. In this mode, the codec 20 is isolated from the secure ISDN network 90 (if present), the secure IP network 25 (if present), and the A/V components 35. In a second mode, the codec 20 is connected to the A/V components 35, the secure ISDN network 90 (if present), and/or the secure IP network 25 (if present). In this mode, the codec 15 is isolated from the A/V components 35, the ISDN network 55, and the IP network 30. In a third mode, the codec 15 is isolated from the A/V components, the ISDN network 55, the IP network 30, and the codec 20 is isolated from the A/V components, the secure ISDN network 90 (if present) and the secure IP network 25 (if present). FIG. 2 depicts an example of the manual control panel 75 with an interface 150. The interface 150 shown in FIG. 2 is a key actuated rotary switch operable to be in one of three positions 120, 123, and 126. The position 126 indicates that the more secure ("red") videoconference system is being accessed, such as the codec 20 and either the ISDN network 90 or network 25 shown in FIG. 1. The position 126 indicates that a less secure ("black") videoconference system is being accessed, such as the codec 15 and either or both ISDN network 55 and/or network 30. The position 123 indicates that both the codec 15 and codec 20 are disabled and isolated. Various colored lights may accompany the key turn positions for a clear visual indication of the system status, if desired. Although only three positions 120, 123, 126 are shown in FIG. 2 it is to be understood that more may be used in other embodiments, depending on the number of videoconference systems accessible to the switching unit 10.

An optional control system 80, also referred to as a controller or a Room Integration Controller may be further coupled to the switching unit 10. The switching unit 10 may accept input from manual control panel 75 and, in some embodiments accept secondary control input from room integration controller 80 subject to a mode selected by the manual control panel 75. The control system 80 enables a user or administrator to monitor the mode of the switching system, observe which codec and network combination (if any) has been selected on the manual control panel 75, and/or control the manually selected system. The control system 80 receives status signals from the switching system, and may control the activation or deactivation of relays within the switching system to the extent allowed by the mode selected by the manual control panel key. In some embodiments, the control system 80 is designed such that the mode selected by the manual control panel 75 cannot be overridden by the control system 80. So, for example, the control system 80 may only be able to activate and de-activate the black videoconference equipment if the manual control panel 75 indicates a black position. Similarly, the control system 80 may only be able to activate and de-activate the red videoconference equipment if the manual control panel 75 indicates a red position. If the manual control panel indicates a red position, the control system 75 cannot access the black position, and vice versa. In some embodiments, the control system 80 communicates with the switching unit 10 solely through DC control signals, not serial input/output signals. Accordingly, the switching unit 10 may advantageously contain no components capable of generating or accepting serial signals. In some embodiments, the switching unit 10 may route serial control signals between the control system 80 and the selected codec, but the switching unit 10 does not alter or interpret the serial signals.

The switching unit 10 further switches between a power switch 45 associated with the codec 15 and network 30, and a power switch 40 associated with the codec 20 and network 25 (if present). In this manner, independent power control is provided for the secure and non-secure (or less secure) videoconferencing systems.

Codecs may also communicate via Ethernet signals. The switching unit 10 is operable to switch both Ethernet and/or ISDN signals between each codec and the Ethernet and ISDN networks appropriate for the selected codec. Media converters 60 and 65 may also be provided to translate fiber Ethernet signals to/from copper Ethernet signals between IP network 30 and codec 15, and secure IP network 25 and codec 20, as shown in FIG. 1. For facilities that use copper Ethernet distribution systems, pairs of media converters connected back-to-back with fiber jumpers may be used to provide the Ethernet isolation and control for their IP network connections.

Switching systems as described herein may be used to control the security status of a videoconferencing equipped facility such as an office, conference room, or auditorium by controlling the videoconferencing equipment located within the facility. In some embodiments, this includes that ability to disable all of the videoconferencing equipment to allow the facility to be used unconnected to a network at whatever security level allowable for that facility (which may be higher than the security level of the highest security level on any of the available networks).

From the foregoing it will be appreciated that, although specific embodiments of the invention have been described herein for purposes of illustration, various modifications may be made without deviating from the spirit and scope of the invention. Accordingly, the invention is not limited except by the appended claims.

What is claimed is:

1. A switching system comprising:
a first codec having a first codec connection;
a first integrated services digital network ("ISDN") having a first security level and a first ISDN line;
an electromechanical relay operable in a first mode to couple the first ISDN network to the first codec and in a second mode to isolate the first codec from the first ISDN network by severing a connection between the first ISDN network and the first codec, routing the first codec connection to ground, and routing the first ISDN line to a loop back plug;
a control unit coupled to the electromechanical relay, the control unit operable to develop a first direct current ("DC") control signal placing the first electromechanical relay in the first mode;
a second codec having a second codec connection;
a second ISDN network having a security level different from the security level of the first ISDN network and a second ISDN line;
a second electromechanical relay operable in a first mode to couple the second ISDN network to the second codec and in a second mode to isolate the second codec from the second ISDN network by severing a connection between the second ISDN network and the second codec, routing the second codec connection to ground, and routing the second ISDN line, to a loop back plug; and
wherein the control unit is further coupled to the second electromechanical relay, the control unit being operable to develop a second DC control signal placing the second electromechanical relay in the first mode.

2. A switching system according to claim 1, wherein the first electromechanical relay is operable to enter the second mode when the first DC control signal is withdrawn.

3. A switching system according to claim 1, wherein the loop-back plug is selected based on a type of the first ISDN line.

4. A switching system according to claim 1, wherein the second electromechanical relay is operable to enter the second mode when the second DC control signal is withdrawn.

5. A switching system according to claim 1, wherein the second loop back plug is selected according to a type of the second ISDN line.

6. A switching system according to claim 1, wherein the control unit is operable to couple the first DC control signal to the first electromechanical relay unit or the second DC control signal to the second electromechanical relay unit, but not both.

7. A switching system according to claim 1, further comprising:
a first power switch coupled to the first codec;
a second power switch coupled to the second codec; and
wherein the control unit is further operable to supply the first DC control signal to the first power switch to control the first codec and to supply the second DC control signal to the second power switch to control the second codec.

8. A switching system according to claim 1, further comprising:
at least one audio or visual peripheral component (an A/V component);
a third electromechanical relay operable in a first mode to couple a first A/V component to the first codec and in a second mode to isolate the first A/V component from the first codec;
a fourth electromechanical relay operable in a first mode to couple the first A/V component to the second codec and in a second mode to isolate the first A/V component from the second codec;
wherein the control unit is further operable to supply the first DC control signal to the third electromechanical relay placing the third electromechanical relay in the first mode or to supply the second DC control signal to the fourth electromechanical relay placing the fourth electromechanical relay in the first mode.

9. A switching system according to claim 8, wherein the audio or visual component comprises a camera, a microphone, or a display device.

10. A switching system according to claim 1, further comprising a user interface coupled to the control unit.

11. A switching system according to claim 10, wherein the user interface comprises a key interface.

12. A switching system according to claim 10, wherein the user interface is further operable to provide a visual indication of the operation of the control unit.

13. A switching system according to claim 7, further comprising:
a first Ethernet internet protocol ("IP") network having a security level comparable to the first ISDN network;
a first media converter coupling the first Ethernet IP network to the first codec;
a second media converter coupling the second Ethernet IP network to the second codec;
a first power supply coupled to the first media converter and the first power switch; and
a second power supply coupled to the second media converter and the second power switch.

14. A switching system according to claim 13, wherein the first and second media converters comprise fiber to copper media converters.

15. A switching system according to claim 13, wherein the first and second media converters comprise a plurality of fiber to copper media converters coupled by a fiber jumper.

16. A switching system according to claim 1, wherein the first and second electromechanical relays comprise DC actuated electromechanical relays.

17. A method for switching between a plurality of videoconference systems, the method comprising:
coupling a first codec to a switch;
coupling a second codec to the switch;
coupling a first integrated services digital network ("ISDN") having a first security level to the switch;
coupling a second ISDN network having a second security level to the switch, where the, first and second security levels are different;
coupling a first Ethernet internet protocol ("IP") network having a security level comparable to the first ISDN network to the switch;
coupling a second Ethernet IP network having a security level comparable to the second ISDN network to the switch;
coupling at least one audio or visual ("A/V") component to the switch;
operating the switch in a first mode wherein:
the first codec is coupled to the first ISDN network;
the first codec is coupled to the first Ethernet IP network;
the first codec is isolated from the second ISDN network;
the first codec is isolated from the second Ethernet IP network;
the first codec is coupled to the A/V component;
the second codec is isolated from the first ISDN network;
the second codec is isolated from the first Ethernet IP network;
the second codec is isolated from the second ISDN network;
the second codec is isolated from the second Ethernet IP network;
the second codec ISDN connection is coupled to ground;
the second ISDN line is coupled to a second loop back plug; and the second codec is isolated from the A/V component.

18. A method according to claim 17, wherein operating the switch in the first mode further indicates that the first codec ISDN connection is not coupled to ground; and the first ISDN line is not coupled to a first loop back plug.

19. A method according to claim 17, further comprising operating the switch in a second mode wherein:
the first codec is isolated from the first ISDN network;
the first codec is isolated from the first Ethernet IP network;
the first codec is isolated from the second ISDN network;
the first codec is isolated from the second Ethernet IP network;
the first codec ISDN connection is coupled to ground;
the first ISDN line is coupled to the first loop back plug;
the first codec is isolated from the A/V component;
the second codec is isolated from the first ISDN network;
the second codec is isolated from the first Ethernet IP network;
the second codec is coupled to the second ISDN network; and
the second codec is coupled to the second Ethernet IP network; and
the second codec is coupled to the A/V component.

20. A method according to claim 19, wherein operating the switch in the second mode further indicates that the second codec ISDN connection is not coupled to ground, and wherein the second ISDN line is not coupled to the second loop back plug.

21. A method according to claim 19, further comprising: operating the switch in a third mode wherein:
the first codec is isolated from the first ISDN network;
the first codec is isolated from the first Ethernet IP network;
the first codec is isolated from the second ISDN network;
the first codec is isolated from the second Ethernet IP network;
the first codec ISDN connection is coupled to ground;
the first ISDN line is coupled to the first loop back plug;
the first codec is isolated from the A/V component;
the second codec is isolated from the first ISDN network;
the second codec is isolated from the first Ethernet IP network;
the second codec is isolated from the second ISDN network;
the second codec is isolated from the second Ethernet IP network;
the second codec ISDN connection is coupled to ground;
the second ISDN line is coupled to the second loop back plug; and
the second codec is isolated from the A/V component.

22. A method according to claim 17, wherein the switch comprises a relay.

23. A method according to claim 22, wherein the relays is a direct current ("DC") actuated electromechanical relay.

24. A method according to claim 17, wherein the A/V component comprises a camera, a microphone, or a display device.

25. A method according to claim 17, further comprising:
coupling a first power switch to the first codec and a first media converter power supply of the first Ethernet IP network;
coupling a second power switch to the second codec and a second media converter power supply of the second Ethernet IP network; and
operating the power switches such that the first power switch couples power to the first codec and the first media converter power supply, and the second power switch couples power to the second codec and the second media converter power supply.

26. A method according to claim 19, wherein operating the switch in the first or the second position comprises providing a visual indicator of the position of the switch.

27. A method to claim 17, further comprising:
operating the switch using a controller coupled to the switch wherein:
the controller senses and reports a position of the switch position at all times;
the controller can sense and report on the status of important internal signals of the switch controller;
in the first switch position the controller can affect control over the first codec, the first ISDN network and the first power switch;
in the first switch position the controller has no control over the second codec, the second ISDN network, or the second power switch;
in the second switch position the controller can affect control over the second codec, the second ISDN network, and the second power switch;
in the second switch position the controller has no control over the first codec, the first ISDN network, or the first power switch; and
in the third switch position the controller has no control over the first codec, the first ISDN network, the first power switch, the second codec, the second ISDN network, or the second power switch.

* * * * *